United States Patent
Ohashi et al.

(10) Patent No.: US 6,328,198 B1
(45) Date of Patent: Dec. 11, 2001

(54) METHOD OF MANUFACTURING JOINT BODY

(75) Inventors: Tsuneaki Ohashi, Ogaki; Tomoyuki Fujii, Nagoya, both of (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 09/298,679

(22) Filed: Apr. 23, 1999

(30) Foreign Application Priority Data

May 1, 1998 (JP) .................................................. 10-122290

(51) Int. Cl.⁷ .................................................. B23K 31/02
(52) U.S. Cl. .................... 228/194; 228/121; 228/122.1
(58) Field of Search .................................. 228/193, 194, 228/201, 202, 122.1, 121, 124.5

(56) References Cited

U.S. PATENT DOCUMENTS

| | | | |
|---|---|---|---|
| 3,993,238 | * | 11/1976 | Brook et al. . |
| 4,552,301 | * | 11/1985 | Liehr et al. . |
| 4,611,745 | * | 9/1986 | Nakahashi et al. .................. 228/123 |
| 4,764,435 | * | 8/1988 | Hosizaki et al. ..................... 428/621 |
| 4,838,474 | * | 6/1989 | Ohashi et al. ........................ 228/121 |
| 4,923,832 | | 5/1990 | Newkirk . |
| 4,946,090 | * | 8/1990 | Hepburn ................................ 228/121 |
| 5,188,164 | * | 2/1993 | Kantner et al. ......................... 164/97 |
| 5,234,152 | * | 8/1993 | Glaeser ................................. 228/121 |
| 5,392,982 | * | 2/1995 | Li ...................................... 228/124.5 |
| 5,451,279 | * | 9/1995 | Kohinata et al. ...................... 156/89 |
| 5,614,043 | | 3/1997 | Ritland . |
| 5,794,838 | * | 8/1998 | Ushikoshi et al. ................... 228/121 |
| 5,807,626 | * | 9/1998 | Naba .................................... 428/210 |
| 5,906,897 | * | 5/1999 | Tanaka et al. . |

FOREIGN PATENT DOCUMENTS

| | | |
|---|---|---|
| 0 164 830 | 12/1985 | (EP) . |
| 0 238 758 | 9/1987 | (EP) . |
| 0 378 501 | 7/1990 | (EP) . |
| 0 409 764 A2 | 1/1991 | (EP) . |
| 7-25675 | 1/1995 | (JP) . |
| 92 00937 | 1/1992 | (WO) . |
| 94 10351 | 5/1994 | (WO) . |

* cited by examiner

*Primary Examiner*—Tom Dunn
*Assistant Examiner*—Jonathan Johnson
(74) *Attorney, Agent, or Firm*—Burr & Brown

(57) ABSTRACT

This invention relates to a method of manufacturing joint body constructed of at lest one pair of substrates comprising a aluminum matrix composite which is made up of an aluminum or aluminum alloy matrix and a reinforcing ceramic, by using an infiltrating material made up of an aluminum alloy.

6 Claims, 4 Drawing Sheets

FIG_1a
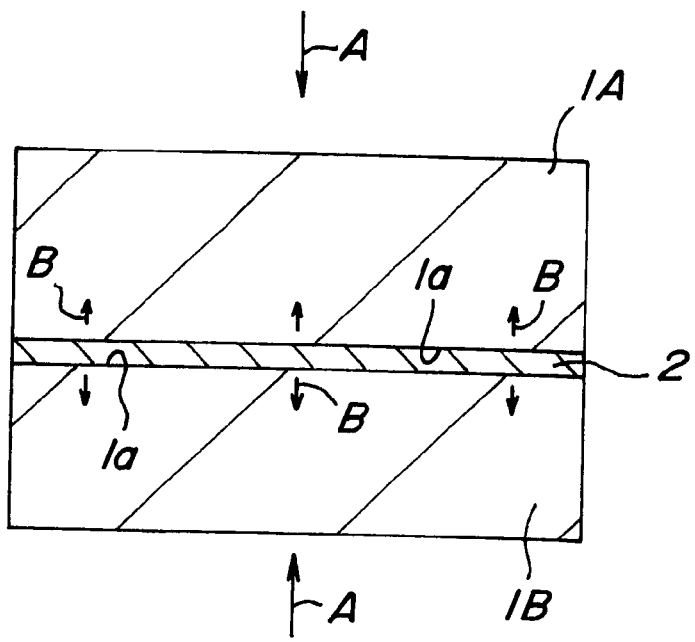
FIG_1b
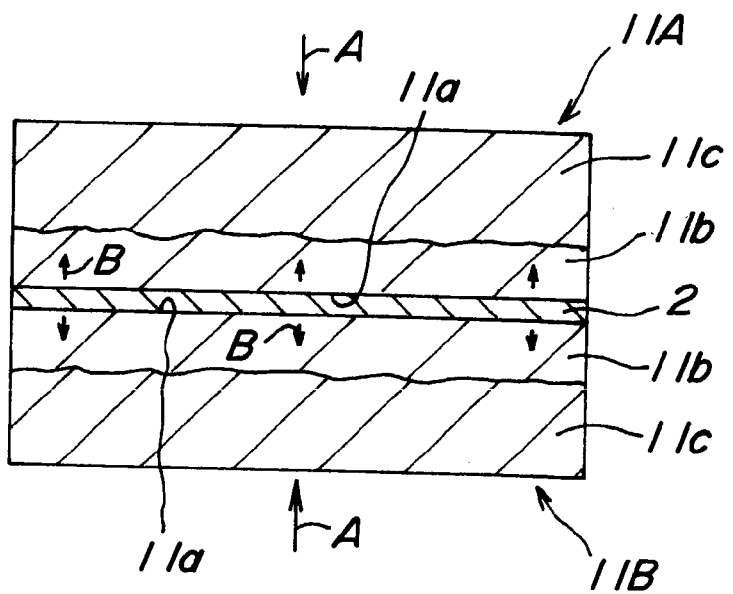

FIG_3
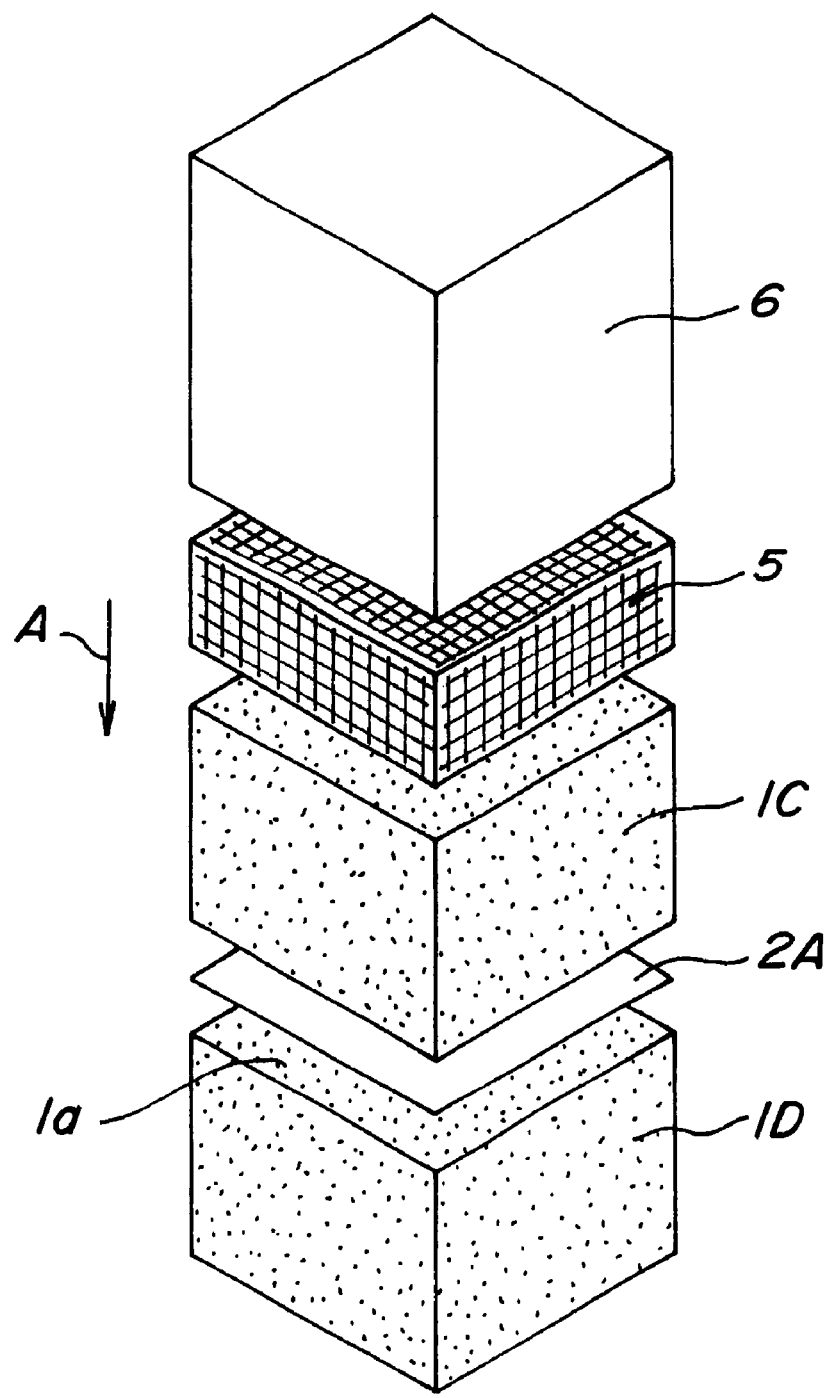

METHOD OF MANUFACTURING JOINT BODY

BACKGROUND OF THE INVENTION

1. Field of the Invention

This invention relates to a method of manufacturing a joint body constructed of at least one pair of substrates comprised of an aluminum matrix composite. The aluminum matrix composite is made of an aluminum or aluminum alloy matrix and a reinforcing ceramic.

2. Description of Related Art

The idea that a metal matrix composite is produced by reinforcing metal with ceramic fiber is well known. However, since ceramic generally has no wettability with melted metal, it has been difficult to form a composite of ceramic and metal. Traditionally, the melted metal is pressed and inserted into a porous ceramic shaped body (a preform), or ceramic particles are mixed with the melted metal to forcedly be dispersed. In such a metal matrix composite, ceramic and metal are not necessarily joined strongly to each other at their joint boundary, and a uniform dispersion of ceramic is difficult.

Further, a method of producing a ceramic matrix or a metal matrix composite by a Lanxide process is known (for example, "Net Shape Manufacturing of CMC and MMC by Lanxide Processes" in "ceramics" 32 (1997) No. 2 p93–97). The Lanxide process, which is a non-pressurized metal infiltration process, increases the wettability between melted aluminum and ceramic in each composite of silicon carbide/aluminum and alumina/aluminum systems.

In the Lanxide method, a preform having an almost final objective shape is formed by using silicon carbide or alumina as reinforcing material, a barrier film for stopping growth is applied on every surface, except for those surfaces which are put into contact with an aluminum alloy. This preform is usually put into contact with the aluminum alloy in nitrogen at a temperature of about 800° C. Aluminum infiltrates into the pores of the preform while wetting the ceramic to form a composite. The resulting composite is confirmed to have an aluminum nitride layer at the boundary between the ceramic and aluminum.

However, problems still remain in expanding the use of aluminum matrix composite to additional markets. For example, in order to form a semiconductor or conductor circuit on a liquid crystal panel, it is necessary to enlarge a susceptor with a liquid crystal panel having a diameter of not less than 1 m. Further the susceptor needs to additionally be attached with a shaft or backboard. When the susceptor, shaft and backboard are integrated, they must be integrated at preforming stage.

As mentioned above, in order to extend usage of the aluminum material composite, to manufacture a preform having a large size or an unusual shape is required. However, it is difficult to make the large and unusual shaped preform and appropriately infiltrate the aluminum alloy into the preform.

Therefore, the inventors studied to manufacture relatively small substrates and then join each other. Further, a technique of joining the aluminum matrix materials each other strongly and airtightly for preventing leakage of air has not been studied.

SUMMARY OF THE INVENTION

It is, therefore, a primary object of the present invention to provide a novel method of manufacturing a joint body constructed of at least one pair of substrates comprised of an aluminum matrix composite which is made of an aluminum or aluminum alloy matrix and a reinforcing ceramic.

According to a preferred aspect of the present invention, there is provided a method of manufacturing a joint body constructed of at least one pair of substrates comprised of an aluminum matrix composite which is made of an aluminum or aluminum alloy matrix and a reinforcing ceramic, in which an infiltrating material made of an aluminum alloy containing aluminum of not less than 70 mol % is placed between joint surfaces of the substrates, and then the substrates and the infiltrating material are subjected to a heat treatment in a high level vacuum at a temperature such that both the matrix and the infiltrating material are melted simultaneously.

According to yet another aspect of the invention, there is also provided a method of manufacturing a joint body constructed of at least one pair of substrates comprised of an aluminum matrix composite which is made up of an aluminum or aluminum alloy matrix and a reinforcing ceramic, in which each joint surface of each substrate is put into contact with the other, the infiltrating material made of an aluminum alloy containing aluminum of not less than 70 mol % is put into contact with at least one of the substrates, and then the substrates and the infiltrating material are subjected to the heat treatment in a high level vacuum at a temperature capable of melting the matrix and causing the infiltrating material to infiltrate the aluminum alloy constituting the infiltrating material into the substrate, and the melted aluminum or aluminum alloy is diffused across each joint surface of each substrate.

In the method of the present invention, a joint body made of the aluminum matrix composite having a trace of impurities or an undetectable amount of impurities at the joint boundary surface of each substrate can be obtained. The joint portion has a high heat resistance and joint strength, and does not have brittleness.

BRIEF DESCRIPTION OF THE DRAWINGS

The invention will be described with reference to the accompanying drawings, wherein:

FIG. 1 (a) is a diagrammatically sectional view for explaining the method of joining the substrates 1A and 1B by using the infiltrating material 2;

FIG. 1 (b) is a diagrammatically sectional view for explaining the method of joining the substrates 11A and 11B by using the infiltrating material 2;

FIG. 2 (b) is a diagrammatically sectional view for explaining the method of joining the substrates 11A and 11B by using the infiltrating material 12;

FIG. 3 is a diagrammatically sectional view for explaining the method of joining the substrates 1C and 1D by using the infiltrating material 2A;

FIG. 4 (b) is an elevational view of FIG. 4 (a).

DETAILED DESCRIPTION OF THE PREFERRED EMBODIMENT

Figure 2A:
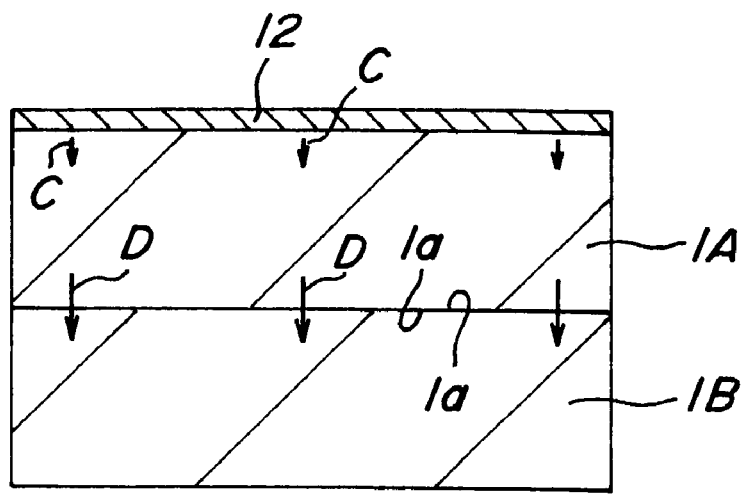
FIG. 2 (a) is a diagrammatically sectional view for explaining the method of joining the substrates 1A and 1B by using the infiltrating material 12.

As schematically shown in FIG. 1(a), one substrate 1A and the other substrate 1B are prepared, and each joint surface 1a of each substrate is opposite to the other. A sheet or film shaped infiltrating material 2 is placed between joint surfaces. The infiltrating material 2 is made of aluminum alloy containing aluminum of not less than 70 mol %. The substrates 1A and 1B and the infiltrating material 2 are subjected to heat treatment in a high level vacuum at a temperature capable of melting both the matrix and the infiltrating material simultaneously. The infiltrating material is diffused as shown by arrow B and blends with the matrix.

In the heat treatment of the substrates 1A and 1B and the infiltrating material 2, a pressure of not less than 20 $gf/cm^2$ is preferably applied thereto in the direction perpendicular to each joint surface 1a of each substrate as shown by arrow A. An upper limit of the pressure is not more than 100 $kgf/cm^2$. Further, the infiltrating material 2 preferably has a thickness of 5–500 $\mu$m.

In another embodiment of the invention, a partially infiltrated region where the matrix is partially infiltrated and pores remain is preferably formed at the joint surface of 1a side of at least one of the substrates 1A and 1B, the infiltrating material being infiltrated into the pores in the partially infiltrated region during the heat treatment.

For example, as schematically shown in FIG. 1(b), the substrates 11A and 11B are provided with the partially infiltrated regions 11b at the joint surface sides. In an outer side of each partially infiltrated region 11b of each substrate, a region 11c where aluminum is infiltrated is respectively formed. The region 11c is a usual aluminum matrix composite, and the pores in the composite are charged with the matrix so that almost none of the pores remain. The region 11c preferably has a relative density of not less than 90%.

On the other hand, the matrix formed in the pores in the partially infiltrated region 11b of the composite is short to charge the whole pores therewith. The region 11b preferably has a relative density of 50–80%.

During the heat treatment, the infiltrating material 2 diffuses into each partially infiltrated region 11b as shown by arrow B. Formation of the partially infiltrated region facilitates to infiltrate the infiltrating material into each substrate and improves the joint strength of the substrate. The infiltrating material infiltrated into the partially infiltrated region functions as the matrix. After joining each substrate, there remains the problem of the infiltrating material at the joint surface of each substrate. However, the infiltration can be continued until the infiltrating material disappears from the joint boundary surface.

In an embodiment schematically shown in FIG. 2(a), each joint surface 1a of each substrate 1A or 1B is put into contact with the other, and the infiltrating material 12 made up of an aluminum alloy containing aluminum of not less than 70 mol % is put into contact with one substrate, for example, 1A. Subsequently, the substrates 1A and 1B and the infiltrating material 12 are subjected to heat treatment in a high level vacuum at a temperature capable of melting the matrix and the infiltrating material 12 to infiltrate the aluminum alloy constituting the infiltrating material 12 into the substrate 1A as shown by arrow C. Subsequently, the melted aluminum or aluminum alloy is diffused across each joint surface 1a of each substrate 1A or 1B as shown by arrow D. As a result, one joint body can be obtained, and a tertiary phase can not be detected at the joint boundary surface.

Figure 2B:
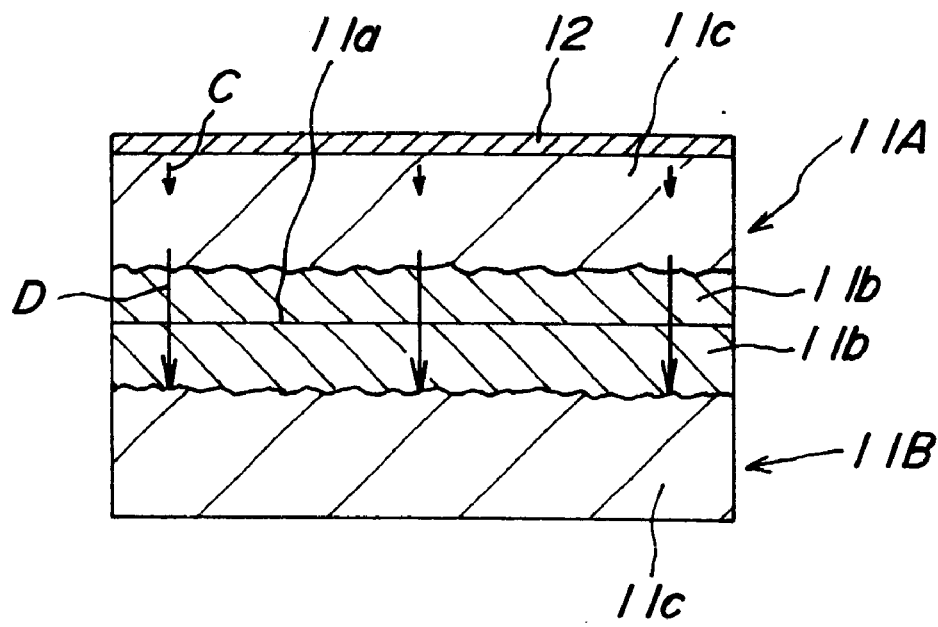

As shown in FIG. 2(b), at least one of the substrates IIA and IIB, preferably both, is provided with the partially infiltrated region where the matrix is partially infiltrated and pores remain. During heat treatment, the aluminum or aluminum alloy is infiltrated into the pores in the partially infiltrated region 11b, and diffused from at least one of the substrates, as shown by an arrow D, across each joint surface 11a of each substrate.

In other embodiment, at least one of the substrates is made from a partially infiltrated aluminum matrix composite.

In the invention, the infiltrating material preferably has a melting point lower than the matrix in the aluminum matrix composite. The infiltrating material preferably melts earlier than the matrix. In particular, the difference between the melting points is not less than 15° C. This ensures good shape retention in the whole joint body.

The atmosphere during heat treatment is required to be a high level vacuum in which oxidation or nitration in the joint surface and the surface of the substrate can be effectively prevented. The pressure during the heat treatment is preferably not more than $1\times10^{-3}$ Torr, and more preferably $1\times10^{-4}$ Torr. From the viewpoint of preventing evaporation of a metal ingredient during the heat treatment, it is preferable that the pressure be not less than $1\times10^{-7}$ Torr.

The joint body according to the invention can be suitably used as a member in a semiconductor manufacturing apparatus or a liquid crystal display manufacturing apparatus. For example, it may be utilized as a high temperature resistant member in a reaction chamber or a large scale heater embedded with a heat generator.

As a member such as a susceptor embedded with a heat generator, an electrode for electrostatic chuck, an electrode for generating a high frequency, or an apparatus provided with a shaft or a backboard which is joined to the susceptor. It may also be utilized as a shadow ring, a tube, a dome, a shower plate or the like may also be exemplified.

The preform will be described below. A material for the ceramic constituting the preform is not limited when the aluminum or aluminum alloy can infiltrate thereinto. However, aluminum based ceramic is preferable, and alumina or aluminum nitride is particularly preferable.

In manufacturing the preform predetermined ceramic particles are diffused in a solvent, such as isopropanol or the like, and mixed with an organic binder, such as a liquid acrylic copolymer binder or the like, and then they are stirred and mixed in a large scale pot mill for 2–40 hours to obtain a slurry. Next, particles having a size of 30–100 $\mu$m are granulated from the slurry by using an explosion proof spray dry machine. Then, the granulated particles are placed into a predetermined mold, and press molded under 200–7000 $kgf/cm^2$ by using an oilhydraulic press machine to manufacture the preform.

Alternatively, the ceramic particles are mixed with ethanol or the like by spraying to obtain a powder, and then the powder is press molded in the same manner as above to obtain the preform.

In infiltrating the aluminum or aluminum alloy into the preform, a spontaneous infiltration process, a pressure infiltration process, or a vacuum infiltration process may be used. Preferably, at least one active metal selected from a group consisting of magnesium, titanium, zirconium, and hafnium is added into the aluminum alloy, the aluminum alloy matrix is infiltrated into the preform by using a non-pressurized metal infiltration process to produce aluminum nitride at the boundary surface between the matrix and the ceramic constituting the preform. This brings a good wettability between the ceramic and the matrix.

In order to manufacture the partially infiltrated region in the substrate, infiltration of aluminum is preferably stopped before completion. Alternatively, aluminum is infiltrated into the whole preform to obtain the aluminum matrix composite, and then the composite is treated by acid to selectively dissolve the matrix. As a result, the partially infiltrated region is obtained. The substrate wholly made of the partially infiltrated aluminum matrix composite can be produced in the same manner.

In the invention, the infiltrating material is made up of the aluminum alloy containing aluminum of 70 mol %. When the alloy is less than 70 mol %, a metal other than the aluminum may become an alloy or an intermetallic compound with aluminum or aluminum alloy in the matrix. This may bring brittleness.

Preferably, the alloy contains 1–10 mol % of at least one active metal selected from a group consisting of magnesium, titanium, zirconium, and hafnium most preferably, it contains magnesium.

The active metal of not less than 1 mol % improves the affinity to a metal ingredient in the substrate or the reinforcing material, and facilitates the infiltration. The active metal of not more than 10 mol % suppresses to locally generate the intermetallic compound or the like, thereby causing brittleness.

The aluminum content in the alloy is obtained as a remainder, by substracting a total content of the active metal content and the tertiary ingredient content mentioned below from 100 mol %, when the infiltrating material total content or the total content of the aluminum alloy constituting the infiltrating material is assumed to be 100 mol %.

The tertiary ingredient can be contained in the infiltrating material or the aluminum alloy constituting the infiltrating material. As the tertiary ingredient, silicon or boron is preferable because it does not influence aluminum. Such a tertiary ingredient lowers the melting point. That is, the infiltrating material with an added tertiary ingredient has a flowability higher than one without an added tertiary ingredient when comparing both at the same temperature. The tertiary ingredient content is preferably 1.5–10 mol %.

Further, the infiltrating material or the alloy constituting the infiltrating material preferably contains magnesium of 1–6 mol % and silicon of 1.5–10 mol %.

In joining, a film made up of at least one metal selected form a group consisting of magnesium, titanium, zirconium, and hafnium may be formed between the joint surface of the substrate and the infiltrating material or between the joint surfaces of the substrates by sputtering, deposition, friction welding, plating or the like. Also a foil made up of at least one metal selected from a group consisting of magnesium, titanium, zirconium, and hafnium may be placed between the joint surface of the substrate and the infiltrating material or between the joint surfaces of the substrates.

Further, before heat treatment, at least one of an oxide film and a nitride film on the joint surface is preferably removed by washing each joint surface of each substrate by using an acid solution or an alkaline solution. When such an oxide film or a nitride film remains on the joint surface, there is a fear that it prevents the infiltrating material or the matrix from infiltrating into the substrate across the joint surface.

EXAMPLE 1

Aluminum nitride particles having an average size of 16 $\mu$m is dispersed in an isopropanol solvent, and then a liquid acrylic copolymer binder is added thereto and stirred and mixed by a large scale pot mill for 4 hours to obtain a slurry. A sphere shaped powder having a size of about 150 $\mu$m is granulated from the slurry by an explosion proof spray dry machine. The granulated powder is charged into a predetermined mold and uniaxially pressmolded under a pressure of 200 kgf/cm$^2$ by an oilhydraulic press to obtain a large preform having a diameter of 380 mm and a thickness of 30 mm.

After sufficiently drying and degreasing the preform, it is put into contact with a melted aluminum alloy liquid (aluminum of 92.6 mol %, magnesium of 5.5 mol %, silicon of 1.9 mol %), in an atmosphere consisting of nitrogen of 99% and hydrogen of 1%, under 1.5 atmospheric pressure, at a temperature of 900° C., for 24 hours, and is infiltrated with aluminum by non-pressurized metal infiltration process, and then the preform is pulled up from the melted liquid to obtain an aluminum matrix composite.

As shown in FIG. 3, substrates 1C and 1D having dimensions of 20 mm×20 mm×20 mm are cut out from the composite, each joint surface of each substrate is ground by a whetstone of #800. Next, each joint surface is washed by acetone and isopropyl alcohol, and further washed by 30% of ammonia water at 70° C. for 10 minutes. And a nickel plating is applied to each joint surface. An aluminum alloy sheet 2A (an infiltrating material) (silicon of 8.7 mol %, magnesium of 1.1 mol %) rolled to dimensions of 20 mm×20 mm×0.1 mm, as shown in FIG. 3, is inserted between the joint surfaces of the substrates. Further a carbon block 5 of 20 mm×20 mm×10 mm is placed on the upper substrate 1C, and further a molybdenum block 6 of 20 mm×20 mm×50 mm is placed on the carbon block to obtain a laminated body. The laminated body is heated up to 700° C. in a vacuum of not less than 3×10$^{-5}$ Torr and held at 700° C. for 10 minutes, and cooled in a furnace to obtain a joint body.

EXAMPLE 2

A joint body is manufactured in the same manner as Example 1 except that before the heat treatment, titanium foils of 20 mm×20 mm×0.005 mm are respectively inserted between each joint surface and an infiltrating material, without forming the nickel plating on each joint surface of each substrate.

EXAMPLE 3

A joint body is manufactured in the same manner as Example 1 except that each joint surface of each substrate is washed for 1 minute by 1% of a hydrochloric acid solution at 20° C., instead of washing by the ammonia water.

EXAMPLE 4

An aluminum matrix composite is manufactured in the same manner as Example 1. And a plate shaped substrate having dimensions of 60 mm×60 mm×20 mm and a cylindrical substrate having an outer diameter of 50 mm, an inner diameter of 40 mm and a length of 30 mm are cut out from the composite. Each joint surface of the plate shaped substrate and the cylindrical substrate are ground by a whetstone of #800. Next, each joint surface is washed by acetone and isopropyl alcohol, and further washed by 30% of ammonia water at 70° C. for 10 minutes.

An aluminum alloy sheet (silicon of 8.7 mol %, magnesium of 1.1 mol %) rolled to dimensions of 20 mm×20 mm×0.1 mm is inserted between the plate shaped substrate and the cylindrical substrate, and further, titanium foils having a thickness of 10 $\mu$m are respectively inserted between the plate shaped substrate and the sheet and between the cylindrical substrate and the sheet. Further a carbon block of 70 mm×70 mm×10 mm is placed on the upper cylindrical substrate, and further a molybdenum block of 30 mm×30 mm×50 mm is placed on the carbon block to obtain a laminated body. The laminated body is heated up to 700° C. in a vacuum of not less than $3\times10^{-5}$ Torr and held at 700° C. for 10 minutes, and cooled in furnace to obtain a joint body.

EXAMPLE 5

Figure 4A:
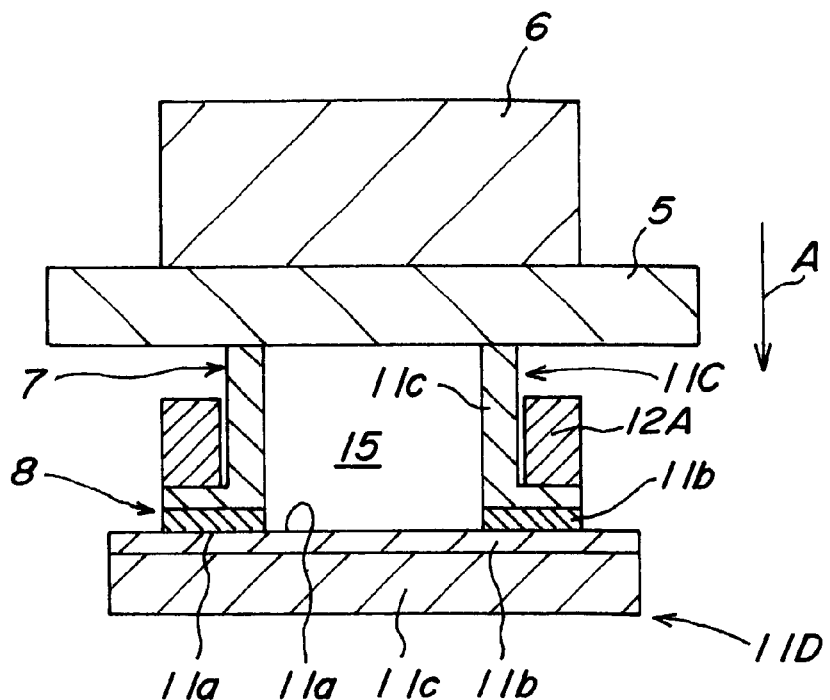
FIG. 4 (a) is a diagrammatically sectional view for explaining the method of joining the substrates 11C and 11D by using the infiltrating material 12A.
Figure 4B:
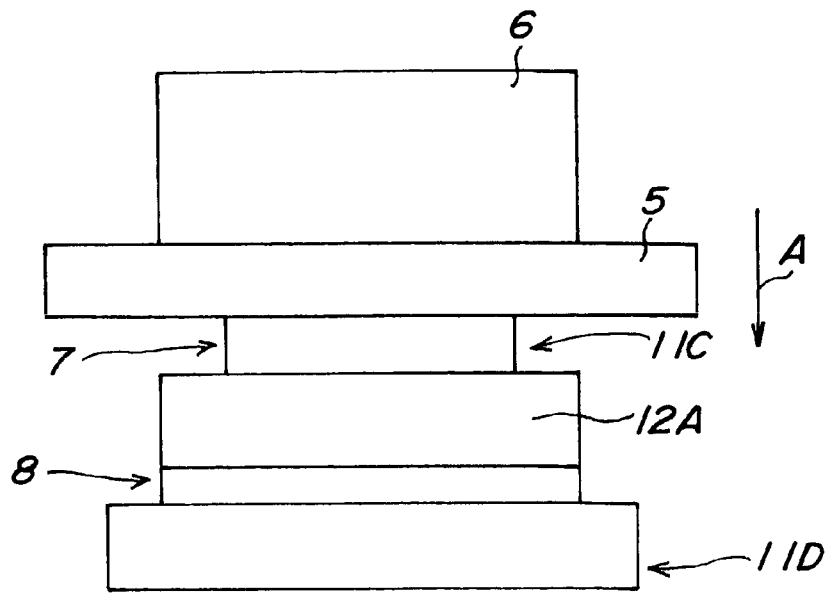

As shown in FIGS. 4 (*a*) and (*b*), a joint test is conducted. Aluminum nitride particles having an average size of 23 μm is dispersed in an isopropanol solvent, and then a liquid acrylic copolymer binder is added thereto and stirred and mixed by a large scale pot mill for 4 hours to obtain a slurry. A sphere shaped powder having a size of about 150 μm is granulated from the slurry by an explosion proof spray dry machine. The granulated powder is charged into a predetermined mold and uniaxially press molded under a pressure of 200 kgf/cm² by oilhydraulic press to obtain a large preform having a diameter of 380 mm and a thickness of 30 mm.

From the preform, a substrate 11D for a susceptor and a substrate 11C for a shaft are cut out by grinding, and degreased. Besides, the preform for the substrate 11D is of 60 mm×60 mm×10 mm, a cylindrical portion 7 of the preform for the substrate 11C for the shaft is of an outer diameter of 36 mm, an inner diameter of 30 mm, and a length of 15 mm, and a cylindrical flange portion 8 is of an outer diameter of 50 mm, an inner diameter of 30 mm, and a thickness of 5 mm. A packing density of each preform is 57% of a theoretical density (porosity: 43%).

Next, each preform is placed with an aluminum alloy lump (silicon of 2.9 mol %, magnesium of 5.5 mol %) on an upper surface thereof, and heated up to 900° C. at rate of 300° C./hour, under an atmospheric pressure while nitrogen of 96% and hydrogen of 4% are flowed, and held at 900° C. Thereby, the aluminum alloy is infiltrated into each preform to obtain substrates 11C and 11D. 11c shows a completely infiltrated region and 11b shows a partially infiltrated region. An amount of the infiltrating material infiltrated is controlled by the alloy amount and a retention time at 900° C. Subsequently, each joint surface 11a is ground by a whetstone of #800 and made to plane, and then is washed by acetone and isopropyl alcohol, and further washed by 30% of ammonia water at 70° C. for 10 minutes.

An infiltrating material 12A made up of a ring shaped alloy lump (silicon of 7.7 mol %, magnesium of 2.8 mol %) is placed on the flange portion 8 of the substrate 11C. The laminated body in FIG. 4 is placed in an electric furnace, and heated up to 900° C. at rate of 150° C./hour, under an atmospheric pressure while nitrogen of 96% and hydrogen of 4% are flowed, and held at 900° C. for 22 hours. Thereby, the aluminum alloy is infiltrated into the vicinity of the joint portion. In joining, a carbon block 5 of 70 mm×70 mm×10 mm and a molybdenum block 6 of 30 mm×30 mm×50 mm are placed thereon.

Evaluation of Joint Portion

With respect to each joint body in Examples 1–5, a helium leak test is conducted and obtain an amount of leakage of less than $1\times10^{-8}$ Torr·liter/second.

As shown from the above description, according to the invention, there is a provision of a novel method of joining at least one pair of substrates comprising aluminum matrix composite which is made up of an aluminum or aluminum alloy matrix and a reinforcing ceramic.

What is claimed is:

1. A method of manufacturing a joint body constructed of at least one pair of substrates, each substrate comprised of a composite including (a) an aluminum matrix or an aluminum alloy matrix, and (b) a reinforcing ceramic, in which each joint surface of each of said substrates is put into contact with the other, an infiltrating material comprising an aluminum alloy containing at least 70 mol % aluminum is put into contact with at least one of the substrates, wherein the substrates and the infiltrating material are subjected to a heat treatment in a high level vacuum at a temperature such that both the aluminum matrix or aluminum alloy matrix, and the infiltrating material, melt, to infiltrate the aluminum alloy constituting the infiltrating material into the substrate, and the melted aluminum or aluminum alloy is diffused across each joint surface of each substrate.

2. A method of manufacturing a joint body according to claim 1, wherein a partially infiltrated region where the matrix partially infiltrates and pores remain is formed in the joint surface side of at least one of the substrates, and the aluminum or aluminum alloy infiltrates into the pores of the partially infiltrated region during the heat treatment, and then diffuses from the partially infiltrated region across each joint surface of each substrate.

3. A method of manufacturing a joint body according to claim 1, wherein at least one of the substrates is made up of a partially infiltrated aluminum matrix composite in which the matrix partially infiltrates and pores remain, and the aluminum alloy constituting the infiltrating material infiltrates into the pores of the substrate during the heat treatment, and then the aluminum or aluminum alloy diffuses from the substrate across each joint surface of each substrate.

4. A method of manufacturing a joint body according to claim 1, wherein the infiltrating material has a melting point lower than the matrix.

5. A method of manufacturing a joint body according to claim 1, wherein each joint surface of each substrate has a Center-line Mean Roughness Ra (JIS B 0601-1982) of not more than 0.7 mm.

6. A method of manufacturing a joint body according to claim 1, wherein each joint surface of each substrate is washed with an acid solution or alkaline solution to remove at least one of an oxide film and a nitride film from each joint surface.

\* \* \* \* \*